United States Patent Office 3,284,391
Patented Nov. 8, 1966

3,284,391
DISPERSIONS FOR TREATING FABRICS
James K. Campbell, % Dow Corning Corporation, Midland, Mich.
No Drawing. Filed Apr. 2, 1962, Ser. No. 184,520
8 Claims. (Cl. 260—29.2)

This invention relates to new dispersions useful for treating fabrics.

Organosiloxanes, particularly those containing methyl radicals and hydrogen atoms bonded to the silicon atom, have become widely used as a treatment for textiles. These siloxanes impart many desirable properties to the textile such as water repellency, stain resistance, improved handling and improved abrasion resistance. These siloxanes have been used on all types of fabrics. Siloxane compositions for treating fabrics are disclosed in the copending application of Gilkey, Serial No. 549,200, filed November 25, 1955, entitled "Aqueous Organopolysiloxane Emulsions for Treating Fabrics," and now abandoned, and the copending application of Gilkey and Alsgaard, Serial No. 109,868, filed May 15, 1961, and entitled "Composition and Method of Treating Fabrics." Although excellent results are obtained when these compositions are used to treat fabrics, certain problems are presented when these compositions are used with creaseproofing agents. These creaseproofing agents are often incorporated in the same treating bath with the siloxane composition. When a catalyst, such as zinc nitrate, is used for the creaseproofing agent the stability of the treating bath is generally decreased. Many times the catalyst for the creaseproofing agent precipitates out of the treating bath. Furthermore, if the catalyst for the creaseproofing agent is incorporated in the catalyst dispersion for the siloxane, the stability of this catalyst dispersion is often decreased.

It is an object of this invention to develop a dispersion which is suitable for treating fabrics and which has improved stability with respect to catalyst precipitation. It is a further object to develop a catalyst dispersion with increased stability and shelf life. In particular, it is an object to develop a catalyst dispersion in which zinc nitrate or other catalysts for creaseproofing agents can be incorporated without decreasing the shelf stability of the dispersion. A final object is to provide a dispersion which when applied to the fabric can be cured to give satisfactory water repellency.

This invention relates to a dispersion consisting essentially of (A) 100 parts by weight of an organotitanium compound selected from the group consisting of:

(1) The reaction product of a titanium compound of the general formula TiR$_4$, wherein R is selected from the group consisting of alkoxy radicals and chlorine atoms, and from 1 to 4 mols per mol of titanium compound of a dihydric alcohol which is no more than slightly soluble in water at 20° C., said dihydric alcohol having from 6 to 12 inclusive carbon atoms, the two

radicals in the dihydric alcohol being separated by less than 2 carbon atoms, and (2) partial hydrolyzates of said reaction product, (B) From 5 to 50 parts by weight of a monocarboxylic acid of at least 8 carbon atoms, and (C) At least 100 parts by weight water.

This dispersion contains 100 parts by weight of the previously described organotitanium compound. This organititanium compound is either the reaction product of a titanium compound of the general formala TiR$_4$ and a dihydric alcohol, or a partial hydrolyzate of this reaction product. When R is an alkoxy radical the titanium reactant is a titanium ortho ester. In this case R is an alkoxy radical, such as methoxy, ethoxy, butoxy, octoxy, pentadecoxy, or octadecoxy. The organotitanium compound can be prepared by the reaction of TiCl$_4$ with the dihydric alcohol. Both of these reactions are well known in the art. One mol of the titanium compound can be used with from 1 to 4 mols of the dihydric alcohol. The preferred proportions are from 2 to 4 mols of the dihydric alcohol per mol of the titanium reactant.

It is important that this dihydric alcohol be no more than slightly soluble in water. Dihydric alcohols having a solubility in water greater than about 10 percent by weight at 20° C. are not generally satisfactory in this invention. It is preferable that the dihydric alcohol have a solubility of less than 5 percent by weight. This dihydric alcohol has from 6 to 12 inclusive carbon atoms with the two

radicals in the dihydric alcohol being separated by less than 2 carbon atoms (i.e. the configurations

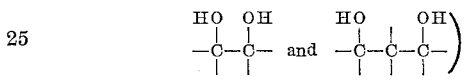

Thus, the dihydric alcohol has from 3 to 10 carbon atoms that are attached to the carbon atoms in the

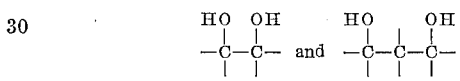

configurations. It should be pointed out that the dihydric alcohol must not only have these characteristics, but must also be no more than slightly soluble in water at 20° C. The preferred dihydric alcohols are the 2,3-diorgano-1,3-diol glycols which are no more than slightly soluble in water. Methods for preparing these glycol titanates are disclosed in Bostwick U.S. Patent 2,463,262, which is hereby incorporated by reference.

This organtitanium compound can also be a partial hydrolyzate of the reaction product of the titanium compound and the dihydric alcohol. In this case the alkoxy radicals or chlorine atoms on the titanium atom are replaced by hydroxyl radicals and/or TiOTi linkages. Any alkoxy radicals or chlorine atoms which are present in the organotitanium catalyst usually hydorlyze when the catalyst is placed in water. Although from 1 to 4 mols of the dihydric alcohol can be used per mol of titanium compound, the preferred range is from 2 to 4 mols of the dihydric alcohol. Suitable examples of dihydric alcohols within the scope of this invention are 2-ethyl-1,3-hexanediol, 2-ethyl-2-n-butyl-1,3-propanediol, 2-methyl-1,3-pentanediol, 4,5-octanediol, 3,4-diethyl-2,5-hexanediol, 2-propyl-1,3-heptanediol. The preferred organo titanium compounds are the reaction products and their partial hydrolyzates of a titanium ortho ester and 2-ethyl-1,3-hexanediol. Preferably, from 2 to 4 mols of 2-ethyl-1,3-hexanediol is used per mol of titanium ortho ester. The best results are obtained with the reaction product of one mol of a titanium ortho ester and 4 mols of 2-ethyl-1,3-hexanediol and the partial hydrolyzate of the reaction product of 1 mol of the titanium ortho ester and 2 mols of 2-ethyl-1,3-hexanediol.

Although the invention is not so limited, it is thought that many of these organotitanium compounds are chelated compounds (i.e. having secondary bonds between the hydroxyl radicals and the titanium atom). In any event, these organotitanium compounds are less sensitive to hydrolysis than titanum ortho esters.

This dispersion also contains from 5 to 50 parts by weight of a monocarboxylic acid of at least 8 carbon atoms per 100 parts of the organotitanium compound. Examples of suitable carboxylic acids are caprylic, capric, lauric, myristic, palmitic, stearic, oleic and behenic. The preferred carboxylic acids are those having from 12 to 20 carbon atoms. Oleic acid is the preferred carboxylic acid. Although the carboxylic acid can be used in an amount from 5 to 50 parts by weight per 100 parts of the organotitanium compound, the preferred range is from 10 to 50 parts of the carboxylic acid. This dispersion also contains at least 100 parts by weight water. The preferred range is from 200 to 400 parts by weight water.

This dispersion is stable and has a long shelf life. Although this invention is not so limited, it is thought this dispersion has a long shelf life because the carboxylic acid retards the hydrolysis of the organotitanium compound. This dispersion gives an improved cure to fabric treated with organosiloxane compositions.

The catalyst used to cure the creaseproofing agent can be incorporated with the catalyst for the organosiloxane material. Thus, this catalyst dispersion can contain from 4 to 50 parts by weight of zinc nitrate per 100 parts of organotitanium compound. The preferred range is from 6 to 20 parts by weight of zinc nitrate. The catalyst dispersions which contain zinc nitrate are also stable and have a long shelf life.

In order to prepare these dispersions, emulsifying agents can be employed. For the purpose of this invention it is preferable that the emulsifying agent be of the non-ionic type such as glycerol monooleate, glycerol monostearate, polyvinyl alcohol and the like. It is to be understood that emulsifying agents are included in the compositions within the scope of the claims of this application.

This catalyst dispersion can be added to an organosilicon dispersion so that a treating bath is prepared which consists essentially of (1) 0.5 to 20 percent by weight of at least one hydrocarbon solvent soluble polysiloxane having an average of from 1.75 to 2.5 inclusive substituents per silicon atom, said substituents being selected from the group consisting of hydrogen atoms, monovalent hydrocarbon radicals of from 1 to 18 inclusive carbon atoms and halogenated monovalent hydrocarbon radicals of from 1 to 18 inclusive carbon atoms, there being an average of from .05 to 1 silicon-bonded hydrogen atom per silicon atom, and (2) from 80 to 99.5 percent by weight water, an organotitanium compound of the above formula and the monocarboxylic acid. In this treating bath it is necessary that the organotitanium compound be present in an amount such that there is in the treating bath dispersion from 0.4 to 7 percent by weight titanium based on the weight of the organosiloxane. A sufficient quantity of monocarboxylic acid is added so that there is from 5 to 50 parts by weight monocarboxylic acid per 100 parts of organotitanium compound. As indicated above, the catalyst dispersion can be merely added to the siloxane dispersion. Alternatively, the entire dispersion can be prepared by adding the organotitanium catalyst and the carboxylic acid and the siloxane to water so as to prepare a dispersion.

The organopolysiloxanes which are suitable for use in this invention include any hydrocarbon solvent soluble polysiloxane having the above defined number of substituents and silicon-bonded hydrogen atoms. These substituents can be monovalent hydrocarbon radicals. Specific examples of these monovalent hydrocarbon radicals which are operative in this invention are alkyl radicals, such as methyl, ethyl, tert-butyl and octadecyl; alkenyl radicals, such as vinyl, allyl and butadienyl; cycloalkyl radicals such as cyclobutyl, cyclopentyl and cyclohexyl; cycloalkenyl radicals, such as cyclopentenyl and cyclohexenyl; aryl radicals such as phenyl, and xenyl; aralkyl radicals such as benzyl and xylyl; and alkaryl radicals such as tolyl. The substituent can also be any of the above types of radicals with halogen atoms attached thereto e.g. chloromethyl, bromophenyl, trifluorotolyl and 3,3,3-trifluoropropyl. Preferably the hydrocarbon radicals are aliphatic hydrocarbon radicals of less than 7 carbon atoms. The preferred hydrocarbon radicals are methyl, ethyl, propyl and amyl. In the siloxane there is on the average from 1.75 to 2.5 inclusive substituents per silicon atom. This siloxane must also contain on the average of from .05 to 1 silicon-bonded hydrogen atom per silicon atom. These siloxanes can be homopolymers or copolymers and mixtures containing any number of different types of siloxanes.

These siloxanes can range in viscosity from thin fluids of low molecular weight to high molecular weight non-flowing gums. Preferably, the viscosity of the material should range from 50 to 20,000 cs. at 25°C. With the high molecular weight materials (i.e. above 1,000,000 cs.), it is desirable to use small amounts of solvent such as benzene, methylene chloride, toluene and the like in order to aid in the dispersion of the siloxane.

Specific examples of homopolymeric siloxanes which can be employed in this invention are dimethylsiloxane, methylhydrogensiloxane, ethylhydrogensiloxane, octadecylhydrogensiloxane, vinylhydrogensiloxane, phenylhydrogensiloxane, xylylhydrogensiloxane, cyclohexylhydrogensiloxane, tolylhydrogensiloxane and benzenehydrogensiloxane. In addition, the siloxanes employed herein can be copolymers or mixtures of any of the above-mentioned siloxanes or hydrocarbon solvent soluble copolymers or mixtures of any of the above-mentioned siloxanes with limited amounts of siloxanes of the unit formulae $R''SiO_{1.5}$, $R''_2SiO$, $R''_3SiO_{.5}$, $HSiO_{1.5}$, $R''H_2SiO_{.5}$, $$R''_2H_2SiO_{.5}$$

and $SiO_2$ units in which $R''$ can be any monovalent hydrocarbon or halogenated monovalent hydrocarbon radical.

For the purpose of this invention the treating bath dispersion employed herein should contain from 0.5 to 20 percent by weight siloxane based on the total weight of the dispersion. When the dispersion contains less than 0.5 percent by weight siloxane, poor treatment of the fabric results. If the concentration of the dispersion exceeds 20 percent by weight siloxane, the dispersion is too unstable.

This dispersion can also contain from 0.5 to 20 percent by weight of a creaseproofing agent. Examples of such creaseproofing agents are urea-formaldehyde resins, such as dimethylol urea, trimethoxymethyl urea; melamine formaldehyde resins, such as dimethylol melamine, pentamethoxymethyl melamine; cyclic ureas, such as dimethylol ethylene urea, dimethoxymethyl ethylene urea, dimethylol uron, dimethylolethyltriazone, dimethylolpropylene urea; and aldehyde derivatives such as pentaerythritol bis-acetyl. A catalyst such as an amine hydrochloride, magnesium chloride or zinc nitrate is usually incorporated with these creaseproofing agents in order to effect a cure. These catalysts are usually incorporated with the organotitanium catalyst and this dispersion added to the silicone and creaseproofing agent dispersion.

The catalyst dispersion of this invention can also be used with the silicone composition disclosed in the copending application of Gilkey and Alsgaard, Serial No. 109,868, filed May 15, 1961, and entitled "Composition and Method of Treating Fabrics," which is hereby incorporated by reference. This composition comprises a mixture of (1) from 1 to 40 percent by weight inclusive of a siloxane of the formula (A) 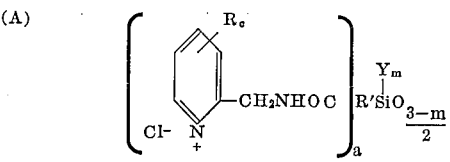

in which R is an aliphatic hydrocarbon radical of less than 4 carbon atoms, c has a value from 0 to 3 inclusive, R' is selected from the group consisting of divalent and trivalent saturated aliphatic radicals of from 2 to 18 inclusive carbon atoms and divalent and trivalent saturated cycloaliphatic hydrocarbon radicals of no more than 18 carbon atoms, $a$ has a value from 1 to 2 inclusive, Y contains from 1 to 18 inclusive carbon atoms and is selected from the group consisting of monovalent hydrocarbon radicals and fluorinated monovalent hydrocarbon radicals and $m$ has an average value from 0 to 2 inclusive which siloxane may contain up to 90 mol percent of (B) a copolymerized siloxane of the formula $Z_bSiO_{4-b/2}$ in which Z contains from 1 to 18 inclusive carbon atoms and is selected from the group consisting of monovalent hydrocarbon radicals and fluorinated monovalent hydrocarbon radicals and $b$ has an average value from 1 to 3 inclusive, and (2) from 60 to 99 percent by weight inclusive of a siloxane having an average of from 1 to 3 substituents per silicon atom, said substituents being selected from the group consisting of hydrogen atoms, monovalent hydrocarbon radicals of from 1 to 18 inclusive carbon atoms and halogenated monovalent hydrocarbon radicals of from 1 to 18 inclusive carbon atoms, in said siloxane (2) there being an average of at least one of said organic radicals per silicon, the proportions of (1) and (2) in said mixture being such that in the total weight of (1) and (2) there is at least .7 percent by weight of siloxane (A). The organotitanium catalyst is used with this composition within the same range of titanium to silicone composition as set forth above. The previously defined range of monocarboxylic acid to organotitanium catalyst also applies. The term "consisting essentially of" in the claims indicate that minor amounts of other ingredients, such as the siloxane 1(A) above, can be included in the treating bath.

The treating bath dispersion remains stable throughout the treatment of many yards of fabric. The dispersions of this invention can be applied to the fabric in any convenient manner, such as by spraying, dipping, flooding or brushing. In general, the fabric is usually dipped into the dispersion until the fabric has become thoroughly wet and is thereafter removed and dried. The siloxane can then be cured by heating from 1 to 20 minutes at a temperature of from 150° to 400° F. Good water repellency is obtained by this treatment.

In general, this treatment causes a pickup of from 0.5 to 5 percent by weight siloxane on the fabric. Preferably the siloxane pickup should range from 1 to 3 percent, since this range gives excellent repellency with the minimum amount of siloxane.

The compositions of this invention can be used to treat any fabric material either organic or inorganic. Specific examples of fabrics which can be treated are material fabrics such as cotton, wool, linen, ramie, silk, suede, leather and camel's hair; synthetic fabrics such as rayon, nylon, vinylidene chloride; acrylonitrile fabrics, ethylene glycol-terephthalic acid ester fabrics and paper and inorganic fabrics such as asbestos and glass fabrics.

The following examples are illustrative only and should not be construed as limiting the invention which is properly delineated in the appended claims.

The spray ratings set forth in the examples were determined in accordance with the American Association of Textile Chemists and Colorists, Standard Test Method 22—1952 which is fully described in the 1960 "Technical Manual and Yearbook of the American Association of Textile Chemists and Colorists," vol. 36, pages 158–160. A spray rating of 100 shows that the fabric is completely water repellent. A spray rating of 50 means that the entire surface of the fabric is wet but no water has soaked through. A spray rating of zero means that the water soaks through the fabric.

*Example 1*

The following catalyst dispersions were prepared by dispersing the catalysts and oleic acid and any other ingredients in water with an emulsifying agent. These catalyst compositions are set forth in Table I. All percentages are percent by weight.

The term "tetraoctylene glycol titanate" refers to the reaction product of 2-ethyl-1,3-hexanediol and a titanium ortho ester at a ratio of 4 mols of the glycol per mol of the titanium ortho ester. The term "dihydroxydioctylene glycol titanate" refers to the partially hydrolyzed reaction product of 2-ethyl-1,3-hexanediol and a titanium ortho ester at a ratio of 2 mols of the glycol per mol of the titanium ortho ester.

*Example 2*

A silicone dispersion was prepared containing 18 percent by weight of a trimethylsilyl-endblocked methylhydrogensiloxane fluid, 12 percent by weight of a trimethylsilyl-endblocked dimethylsiloxane fluid of about 12,500 cs., 2 percent by weight of a glycerol monostearate, 0.2 percent acetic acid and 67.8 percent water.

*Example 3*

The treating baths set forth in Table II were prepared by mixing the silicone dispersion of Example 2 with one of the catalyst dispersions of Table I and sufficient water in order to obtain the desired concentration. Red poplin was cut into 8" x 8" squares and dipped into each of these treating baths, pressed between squeeze rollers, air dried, and then cured in accordance with the schedule set forth in Table II. The spray ratings were obtained in accordance with the procedure set forth above. The treating baths remained stable throughout the treatment.

*Example 4*

A treating bath was prepared by adding the silicone dispersion of Example 2 and one of the catalyst dispersions of Table I to sufficient water to obtain the desired concentration. These baths were acidified to a pH of 2 with sulfuric acid. Several types of wool cloth were cut into 8" x 8" squares and then dipped into the dispersion, pressed between squeeze rollers, air dried and cured at 225° F. for the time set forth in Table III. The spray ratings were obtained in accordance with the procedure set forth above. This treating bath remained stable throughout the treatment.

TABLE I

| Percent Titanate | Percent Oleic Acid | Percent Acetic Acid | Percent Solvent | Percent Emulsifying Agent | Percent Zinc Nitrate | Percent Water |
|---|---|---|---|---|---|---|
| 1. 30% tetraoctylene glycol titanate | 10 | | 20% of a mixture of 25% perchloroethylene and 75% toluene. | 2% polyvinyl alcohol | | 38 |
| 2. 30% tetraoctylene glycol titanate | 5 | | 20% of a mixture of 15% perchloroethylene and 85% toluene. | do | | 43 |
| 3. 30% tetraoctylene glycol titanate | 10 | | 20% of a mixture of 25% perchloroethylene and 75% toluene. | do | 5 | 33 |
| 4. 30% tetraoctylene glycol titanate | 5 | | do | do | 5 | 38 |
| 5. 30% tetraoctylene glycol titanate | 5 | | 20% of a mixture of 15% perchloroethylene and 85% toluene. | do | 2.5 | 40.5 |
| 6. 30% tetraoctylene glycol titanate | 5 | | do | do | 1 | 42 |
| 7. 30% tetraoctylene glycol titanate | 5 | 1 | do | do | 5 | 37 |
| 8. 30% tetraoctylene glycol titanate | 5 | | do | do | 4 | 39 |
| 9. 30% tetraoctylene glycol titanate | 5 | | do | do | 3 | 40 |
| 10. 30% tetraoctylene glycol titanate | 5 | .5 | do | do | 5 | 37.5 |
| 11. 25% tetraoctylene glycol titanate | 4 | | 15% of a mixture of 70% perchloroethylene and 30% toluene. | do | 3 | 51 |
| 12. 20% dihydroxydioctylene glycol titanate. | 5 | | 20% xylene | 2% of an octylphenol-ethylene oxide emulsifier. | 3 | 50 |

TABLE II

| Treating Composition | | Spray ratings | | | |
|---|---|---|---|---|---|
| Percent silicone dispersion | Percent catalyst dispersion | 2 min. at 275° F. | 2 min. at 300° F. | 1.5 min. at 325° F. | 2 min at 325° F. |
| 1. 5% of Ex. 2 | 1% of No. 1 of Ex. 1 |  | 80 |  |  |
| 2. 5% of Ex. 2 | 1% of No. 2 of Ex. 1 | 80 | 90 |  |  |
| 3. 5% of Ex. 2 | 1% of No. 3 of Ex. 1 [1] |  | 100 |  | 100 |
| 4. 5% of Ex. 2 | 1% of No. 4 of Ex. 1 [1] | 90–100 | 100 |  | 100 |
| 5. 5% of Ex. 2 | 1% of No. 8 of Ex. 1 | 80–90 | 100 | 100 |  |
| 6. 5% of Ex. 2 | 1% of No. 9 of Ex. 1 | 100 | 100 | 100 |  |
| 7. 5% of Ex. 2 | 1% of No. 10 of Ex. 1 | 90 | 100 | 100 |  |
| 8. 5% of Ex. 2 | 1% of No. 7 of Ex. 1 |  | 90 |  | 100 |

[1] The catalyst dispersion was prepared two weeks prior to use.

TABLE III

| Treating Composition | | | Spray Ratings | | |
|---|---|---|---|---|---|
| Fabric | Percent silicone dispersion | Percent catalyst dispersion | 5 min. | 7 min. | 10 min. |
| 1. Tan wool flannel | 5% of Ex. 2 | 4% of No. 4 of Table I | 90 | 100 | 100 |
| 2. Brown wool flannel | 5% of Ex. 2 | 4% of No. 4 of Table I | 80 | 90–100 | 90–100 |
| 3. Wool gabardine | 5% of Ex. 2 | 4% of No. 4 of Table I |  | 100 | 100 |

*Example 5*

The treating baths set forth in Table IV were prepared by mixing the silicone dispersion of Example 2 with one of the catalyst dispersions of Table I, a creaseproofing agent and sufficient water in order to obtain the desired concentration. Various types of fabric were cut into 8" x 8" squares and dipped into each of these treating baths and then pressed between squeeze rollers. The cloth was then air dried and cured in accordance with the schedule set forth in Table IV. The spray ratings were obtained in accordance with the procedure set forth above.

TABLE IV

| Treating Composition | | | | | Spray ratings | | | | | |
|---|---|---|---|---|---|---|---|---|---|---|
| Fabric | 1 [1] | 2 [2] | 3 [3] | 4 [4] | 2 min. at 275° F. | 2 min. at 300° F. | 2 min. at 325° F. | 1.5 min. at 300° F. | 1.5 min. at 325° F. | 1.5 min. at 350° F. |
| 1. Tan sateen | 5% of Ex. 2 | .5% of No. 4 of Table I | 5% |  | 100 |  |  | 100 | 100 |  |
| 2. Tan sateen | 5% of Ex. 2 | .5% of No. 4 of Table I | 5% |  | 100 |  |  | 100 | 100 |  |
| 3. Tan sateen | 5% of Ex. 2 | .5% of No. 4 of Table I | 5% |  | 100 |  |  | 100 | 100 |  |
| 4. Tan sateen | 5% of Ex. 2 | .5% of No. 4 of Table I | 5% |  | 100 |  |  | 100 | 100 |  |
| 5. Tan sateen | 5% of Ex. 2 | .5% of No. 4 of Table I | 5% |  | 100 |  |  | 100 | 100 |  |
| 6. Tan sateen | 5% of Ex. 2 | .5% of No. 4 of Table I | 5% |  | 100 |  |  | 100 | 100 |  |
| 7. Tan sateen | 5% of Ex. 2 | .5% of No. 2 of Table I | 5% | 1% zinc nitrate | 100 |  |  | 100 | 100 |  |
| 8. Tan sateen | 5% of Ex. 2 | .5% of No. 2 of Table I | 5% | do | [5] 80–90 | [5] 100 |  |  | [5] 100 |  |
| 9. Tan sateen | 5% of Ex. 2 | .5% of No. 2 of Table I | 5% | do | 100 |  |  | 100 | 100 |  |
| 10. Tan sateen | 5% of Ex. 2 | 1% of No. 5 of Table I | 5% | 1% magnesium chloride |  | 90 | 100 |  |  |  |
| 11. Tan sateen | 5% of Ex. 2 | 1% of No. 6 of Table I | 5% | do |  | 90–100 | 100 |  |  |  |
| 12. Tan sateen | 5% of Ex. 2 | .5% of No. 2 of Table I | 5% | 1% zinc nitrate | 100 | 100 |  |  | 100 |  |
| 13. Tan sateen | 5% of Ex. 2 | .5% of No. 2 [6] of Table I | 5% | do | 80 | 100 |  |  | 100 |  |
| 14. Tan sateen | 5% of Ex. 2 | .5% of No. 2 [7] of Table I | 5% | do | 80 | 100 |  |  | 100 |  |
| 15. Red poplin | 5% of Ex. 2 | 1% of No. 2 of Table I | 5% | 2% magnesium chloride |  |  |  | 90–100 | 100 |  |
| 16. Cotton with 80 warp and 80 fill threads per inch | 5% of Ex. 2 | 1% of No. 11 of Table I | 5% | 1% zinc nitrate |  |  |  | 100 | 100 | 100 |
| 17. Red poplin | 5% of Ex. 2 | 1% of No. 11 of Table I | 5% | do |  |  |  | 90–100 | 100 | 100 |
| 18. Cotton with 80 warp and 80 fill threads per inch | 5% of Ex. 2 | 1% of No. 11 of Table I | 5% and 1.5% polyvinyl acetate | do |  |  |  | 100 | 100 | 100 |
| 19. Red poplin | 5% of Ex. 2 | 1% of No. 11 of Table I | 10% and 1.5% polyvinyl acetate | do |  |  |  | 80 | 80–90 | 90 |

[1] Percent silicone dispersion.
[2] Percent catalyst for silicone resin.
[3] Percent creaseproofing agent.
[4] Percent catalyst for creaseproofing agent.
[5] Sample was cured without air drying.
[6] The catalyst was heat-aged at 120° F. for one week.
[7] The catalyst was heat-aged for 2 weeks at 120° F.

Example 6

The following materials are used in Table V.

(A) A silicone aqueous dispersion containing 24 percent by weight of a trimethylsilyl-endblocked methylhydrogensiloxane fluid, 6 percent hydroxyl-endblocked dimethylsiloxane fluid, 2.8 percent toluene, 1.2 percent perchloroethylene, .1 percent acetic acid and 1.5 percent of an emulsifying agent.

(B) A silicone aqueous dispersion containing 50 percent by weight of copolymer of 50 mol percent dimethylsiloxane and 50 mol percent

The treating baths set forth in Table V were prepared by mixing the above silicone dispersions and one of the catalyst dispersions of Table I with sufficient water in order to obtain the desired concentration. Pieces of cloth were cut into 8" x 8" squares and dipped into each of these treating baths, pressed between rollers and cured after being air dried. The treating baths remained stable throughout treatment. The spray ratings were obtained in accordance with the procedure set forth above.

TABLE V

| Fabric | Treating Composition | | | | Spray ratings | | |
|---|---|---|---|---|---|---|---|
| | Percent Silicone dispersion | Percent Catalyst for silicone resin | Percent Crease Resistant resin | Catalyst for crease resistant resin | 1.5 min. at 300° F. | 1.5 min. at 325° F. | 1.5 min. at 350° F. |
| 1. Cotton with 80 warp and 80 fill threads per inch. | 5% A and 0.125% B | 1% of No. 11 of Table I | 5% | 1% zinc nitrate | 100 | 100 | 100 |
| 2. Red poplin | 5% A and 0.125% B | 1% of No. 11 of Table I | 5% | ...do... | 100 | 100 | 100 |
| 3. Cotton with 80 warp and 80 fill threads per inch. | 5% A and 0.125% B | 1% of No. 11 of Table I | 5% | 1% amine hydrochloride | 100 | 100 | 100 |
| 4. Red poplin | 5% A and 0.125% B | 1% of No. 11 of Table I | 5% | ...do... | 90 | 100 | 100 |
| 5. Red poplin | 5% A and 0.125% B | 1% of No. 12 of Table I | 5% | 1% zinc nitrate | 90 | 90 | 100 |
| 6. Cotton with 80 warp and 80 fill threads per inch. | 5% A and 0.125% B | 1% of No. 12 of Table I | 5% | ...do... | 100 | 100 | 100 |
| 7. Red poplin | 5% A and 0.125% B | 1% of No. 11 of Table I | 5% | ...do... | 90 | 100 | 100 |
| 8. Cotton with 80 warp and 80 fill threads per inch. | 5% A and 0.125% B | 1% of No. 11 of Table I | 5% | ...do... | 100 | 100 | 100 |
| 9. Red poplin | 5% A and 0.125% B | 1% of No. 12 of Table I | 5% | 1% amine hydrochloride | 100 | 100 | 100 |
| 10. Cotton with 80 warp and 80 fill threads per inch. | 5% A and 0.125% B | 1% of No. 12 of Table I | 5% | ...do... | 100 | 100 | 100 |
| 11. Red poplin | 5% A and 0.125% B | 1% of No. 11 of Table I | 5% | ...do... | 80 | 80 | 80 |
| 12. Cotton with 80 warp and 80 fill threads per inch. | 5% A and 0.125% B | 1% of No. 11 of Table I | 5% | ...do... | 100 | 100 | 100 |

Example 7

A stable dispersion is obtained when the following silicone dispersions are substituted at the same concentration as the dispersion used in No. 1 of Table IV. In each of the following dispersions the concentration of glycerol monostearate is 2 percent by weight and the concentration of acetic acid is .2 percent by weight and the water content is 67.8 percent by weight.

(A)
18 percent by weight of an amylhydrogensiloxane and
12 percent by weight of a trimethylsilyl-endblocked dimethylsiloxane fluid of about 12,500 cs.

(B)
18 percent by weight of a trimethylsilyl-endblocked methylhydrogensiloxane fluid,
10 percent by weight of a trimethylsilyl-endblocked dimethylsiloxane fluid of about 12,500 cs. and
2 percent by weight of an octadecylmethylsiloxane.

(C)
10 percent by weight of a trimethylsilyl-endblocked methylhydrogensiloxane fluid,
10 percent by weight of a trimethylsilyl-endblocked dimethylsiloxane fluid of about 12,500 cs. and
2 percent by weight of a chlorophenylmethylsiloxane.

(D)
10 percent by weight of a trimethylsilyl-endblocked methylhydrogensiloxane and
20 percent by weight of a fluid copolymer composed of 60 mol percent dimethylsiloxane, 35 mol percent monomethylsiloxane and 5 mol percent monophenylsiloxane.

(E)
30 percent by weight of a fluid copolymer of 87.5 mol percent dimethylsiloxane and 12.5 mol percent $HSiO_{1.5}$.

Example 8

When the following reaction products are substituted for the titanate catalyst used in Sample No. 4 of Table I at the same concentration a stable dispersion is obtained.

| Titanium-ortho ester | Dihydric alcohol |
|---|---|
| 1. 20 mol percent $TiCl_4$ | 80 mol percent 2-ethyl-2-n-butyl-1,3-propanediol. |
| 2. 50 mol percent $Ti[OCH_2CH-(CH_3)_2]_4$ | 50 mol percent 2-methyl-1,3-pentanediol. |
| 3. 75 mol percent $Ti[OCH_2CH-(CH_2CH_3)(CH_2)_3CH_3]$ | 25 mol percent 4,5-octanediol. |
| 4. 80 mol percent $Ti[OCH(CH_3)_2]_4$ | 20 mol percent 3,4-diethyl-2,5-hexanediol. |
| 5. 20 mol percent $Ti[OCH(CH_3)_2]_4$ | 80 mol percent 2-propyl-1,3-heptanediol. |

Good results are obtained when the above dispersions are substituted for the titanate catalyst used in Sample No. 1 in Table IV at the same Ti to silicone solids ratio and the procedure of Example 5 is followed.

That which is claimed is:
1. A dispersion consisting essentially of
 (A) 100 parts by weight of an organotitanium compound selected from the group consisting of
  (1) the reaction product of a titanium compound of the general formula $TiR_4$, wherein R is selected from the group consisting of alkoxy radicals and chlorine atoms and from 1 to 4 mols per mol of titanium compound of a dihydric alcohol which is no more than slightly soluble in water at 20° C., said dihydric alcohol having from 6 to 12 inclusive carbon atoms, the two

radicals in the dihydric alcohol being separated by less than 2 carbon atoms, and
(2) the partial hydrolyzate of said reaction product,
(B) from 5 to 50 parts by weight of a monocarboxylic acid of at least 8 carbon atoms, and
(C) at least 100 parts by weight water.

2. The dispersion of claim 1 wherein the organotitanium compound is the reaction product of a titanium ortho ester of the general formula TiR$_4$, wherein R is an alkoxy radical and from 1 to 4 mols per mol of titanium orthoester of a dihydric alcohol which is no more than slightly soluble in water at 20° C., said dihydric alcohol having from 6 to 12 inclusive carbon atoms, the two

radicals in the dihydric alcohol being separated by less than 2 carbon atoms and the monocarboxylic acid has from 12 to 20 inclusive carbon atoms.

3. A dispersion consisting essentially of
(A) 100 parts by weight of the reaction product of a titanium orthoester of the general formula TiR$_4$, wherein R is an alkoxy radical and from 1 to 4 mols per mol of titanium ortho ester of

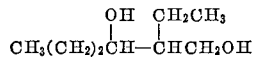

(B) from 10 to 50 parts by weight of oleic acid and
(C) from 200 to 400 parts by weight of water.

4. A dispersion consisting essentially of
(A) 100 parts by weight of an organotitanium compound selected from the group consisting of
(1) the reaction product of a titanium compound of the general formula TiR$_4$, wherein R is selected from the group consisting of alkoxy radicals and chlorine atoms, and from 1 to 4 mols per mol of titanium compound of a dihydric alcohol which is no more than slightly soluble in water at 20° C., said dihydric alcohol having from 6 to 12 inclusive carbon atoms, the two

radicals in the dihydric alcohol being separated by less than 2 carbon atoms, and
(2) the partial hydrolyzate of said reaction product,
(B) from 5 to 50 parts by weight of a monocarboxylic acid of at least 8 carbon atoms, and
(C) at least 100 parts by weight water, and
(D) from 4 to 50 parts by weight of zinc nitrate.

5. The dispersion of claim 4 wherein the organotitanium compound is the reaction product of a titanium ortho ester of the general formula TiR$_4$, wherein R is an alkoxy radical and from 1 to 4 mols per mol of titanium ortho ester of a dihydric alcohol which is no more than slightly soluble in water at 20° C., said dihydric alcohol having from 6 to 12 inclusive carbon atoms, the two

radicals in the dihydric alcohol being separated by less than 2 carbon atoms and the monocarboxylic acid has from 12 to 20 inclusive carbon atoms.

6. A dispersion consisting essentially of
(A) 100 parts by weight of the reaction product of a titanium ortho ester of the general formula TiR$_4$, wherein R is an alkoxy radical and from 1 to 4 mols per mol of titanium ortho ester of

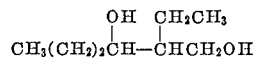

(B) from 10 to 50 parts by weight of oleic acid,
(C) from 200 to 400 parts by weight of water, and
(D) from 6 to 20 parts by weight of zinc nitrate.

7. A dispersion consisting essentially of
(1) from 0.5 to 20 percent by weight of at least one hydrocarbon solvent soluble polysiloxane having an average of from 1.75 to 2.5 inclusive substituents per silicon atom, said substituents being selected fom the group consisting of hydrogen atoms, monovalent hydrocarbon radicals of from 1 to 18 inclusive carbon atoms and halogenated monovalent hydrocarbon radicals of from 1 to 18 inclusive carbon atoms, there being an average of from .05 to 1 silicon-bonded hydrogen atom per silicon atom,
(2) from 80 to 99.5 percent by weight water and an organotitanium compound selected from the group consisting of
(A) the reaction product of a titanium compound of the general formula TiR$_4$, wherein R is selected from group consisting of alkoxy radical and chlorine atoms, and from 1 to 4 mols per mol of titanium compound of a dihydric alcohol which is no more than slightly soluble in water at 20° C., said dihydric alcohol having from 6 to 12 inclusive carbon atoms, the two

radicals in the dihydric alcohol being separated by less than 2 carbon atoms, and
(B) the partial hydrolyzate of said reaction product, and a monocarboxylic acid of at least 8 carbon atoms, said organotitanium compound being present in an amount such that there is in dispersion from 0.4 to 7 percent by weight Ti based on the weight of (1), said monocarboxylic acid being present in an amount such that there is from 5 to 50 parts by weight monocarboxylic acid per 100 parts of organotitanium compound.

8. A dispersion consisting essentially of
(1) from 0.5 to 20 percent by weight of a mixture of from 20 to 80 mol percent methylhydrogensiloxane and from 20 to 80 mol percent of a dimethylsiloxane,
(2) from 80 to 99.5 percent water, and
(A) 100 parts by weight of an organotitanium compound which is the reaction product of a titanium ortho ester of the general formula TiR$_4$, wherein R is an alkoxy radical and from 1 to 4 mols per mol of titanium ortho ester of

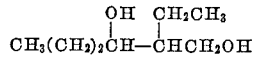

and oleic acid, said organotitanium compound being present in an amount such that there is in the dispersion from 0.4 to 7 percent by weight Ti based on the weight of (1), said oleic acid being present in an amount such that there is from 10 to 50 parts by weight of the oleic acid per 100 parts of the organotitanium compound.

References Cited by the Examiner
UNITED STATES PATENTS

| | | | |
|---|---|---|---|
| 2,774,690 | 12/1956 | Crockett et al. | 117—145 XR |
| 2,970,976 | 2/1961 | Leclercq et al. | 260—29.2 |
| 3,096,524 | 7/1963 | Mizell | 260—29.4 XR |

LEON J. BERCOVITZ, *Primary Examiner.*

DONALD E. CZAJA, J. J. KLOCKO,
*Assistant Examiners.*